(12) United States Patent
Dehais (10) Patent No.: US 10,487,740 B2
(45) Date of Patent: Nov. 26, 2019

(54) MULTI-FLAPPER CHECK VALVE WITHOUT CENTER SUPPORTS

(71) Applicant: Hamilton Sundstrand Corporation, Windsor Locks, CT (US)

(72) Inventor: John M. Dehais, Windsor, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 281 days.

(21) Appl. No.: 14/742,121

(22) Filed: Jun. 17, 2015

(65) Prior Publication Data

US 2016/0369696 A1 Dec. 22, 2016

(51) Int. Cl.
*F16K 15/03* (2006.01)
*F02C 7/18* (2006.01)
*F02C 9/18* (2006.01)

(52) U.S. Cl.
CPC ............ *F02C 7/18* (2013.01); *F02C 9/18* (2013.01); *F16K 15/035* (2013.01); *Y02T 50/671* (2013.01); *Y02T 50/675* (2013.01)

(58) Field of Classification Search
CPC ............ F16K 15/035; F02C 7/18; F02C 9/18
USPC ................... 138/44, 45, 46; 251/212
See application file for complete search history.

(56) References Cited

U.S. PATENT DOCUMENTS

| | | |
|---|---|---|
| 3,118,467 A | 1/1964 | Kuhn |
| 3,483,824 A | 12/1969 | Sprague |
| 4,209,037 A | 6/1980 | Upham |
| 4,406,022 A | 9/1983 | Roy |
| 4,458,876 A * | 7/1984 | Schaeper ............... E21B 33/06 251/1.2 |
| 5,078,739 A | 1/1992 | Martin |
| 5,628,792 A | 5/1997 | Lentell |
| 6,035,896 A | 3/2000 | Liardet |
| 6,174,232 B1 * | 1/2001 | Stoll ................. H05K 7/20172 361/695 |
| 6,710,240 B1 * | 3/2004 | Chen ................. H05K 7/20145 174/135 |
| 8,387,950 B2 * | 3/2013 | Hummel ............... B64D 15/04 137/68.11 |
| 2004/0118105 A1 * | 6/2004 | Aitchison ............... F01D 25/12 60/266 |
| 2011/0056569 A1 | 3/2011 | Chambo et al. |
| 2013/0319559 A1 * | 12/2013 | Bormioli ................... F16K 1/18 137/798 |

FOREIGN PATENT DOCUMENTS

| | | |
|---|---|---|
| DE | 202007017181 U1 | 2/2008 |
| WO | 2004055338 A1 | 7/2004 |

OTHER PUBLICATIONS

Exented European Search Report, for European Patent Application No. 16175071.6, dated Nov. 11, 2016, 7 pages.

* cited by examiner

*Primary Examiner* — Marina A Tietjen
*Assistant Examiner* — Paul J Gray
(74) *Attorney, Agent, or Firm* — Kinney & Lange, P.A.

(57) ABSTRACT

A multi-flapper check valve includes a housing with an opening surrounded by a ring-shaped rim, a plurality of flappers, and a hinge that connects an end of each flapper to the rim of the housing. When the multi-flapper check valve is in a closed position, a first edge of each flapper seals against a second edge of an adjacent flapper.

18 Claims, 8 Drawing Sheets

Prior Art

MULTI-FLAPPER CHECK VALVE WITHOUT CENTER SUPPORTS

BACKGROUND

The present disclosure relates to check valves. More specifically, the present disclosure relates to multi-flapper check valves for use in environmental control systems.

Environmental control systems in aircraft condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the initial ambient air temperature is very low. Thus, under most conditions, heat must be removed from air by the environmental control system before the air is delivered to the aircraft cabin. Environmental control systems can include air cycle machines that include a compressor section and at least one turbine section that can be used to cool and pressurize the air.

Environmental control systems include check valves positioned throughout the system to allow air to flow in a first direction through the environmental control system and to prevent the air from flowing in a second direction through the environmental control system. In a closed position, check valves prevent air from moving through the environmental control system. Once the pressure of the air in the system reaches a certain level, the check valve opens to allow air to flow through the system. In this manner, check valves can regulate how air moves through the environmental control system based on the pressure of the air in the system.

SUMMARY

A multi-flapper check valve includes a housing with an opening surrounded by a ring-shaped rim, a plurality of flappers, and a hinge that connects an end of each flapper to the rim of the housing. When the multi-flapper check valve is in a closed position, a first edge of each flapper seals against a second edge of an adjacent flapper.

An environmental control system includes a rotary machine and a check valve in the rotary machine. The rotary machine includes a compressor section with a compressor rotor, and a turbine section with a turbine rotor. The check valve includes a housing with an opening surrounded by a ring-shaped rim, and a plurality of flappers connected to the ring-shaped rim. When the check valve is in a closed position, a first edge of each flapper seals against a second edge of an adjacent flapper.

A method includes flowing air through a rotary machine, and controlling the flow of air through the rotary machine with a check valve positioned in the rotary machine. The check valve includes a housing with an opening surrounded by a ring-shaped rim and a plurality of flappers connected to the ring-shaped rim, wherein a first edge of each flapper seals against a second edge of an adjacent flapper.

DETAILED DESCRIPTION

Figure 1:
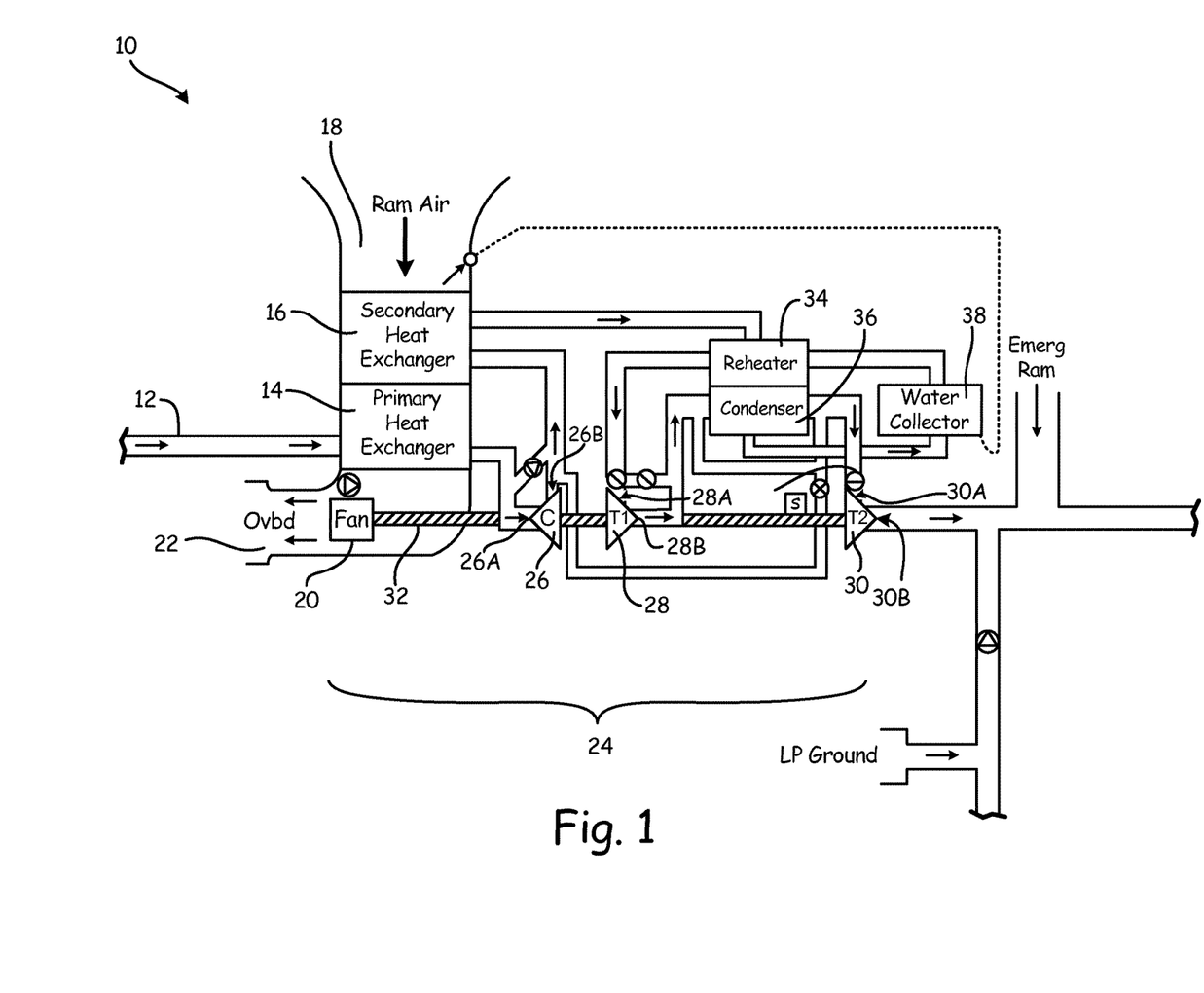
FIG. 1 is a schematic of an environmental control system.

FIG. 1 is a schematic of environmental control system 10. FIG. 1 shows environmental control system 10, air inlet 12, primary heat exchanger 14, secondary heat exchanger 16, ram air inlet 18, ram air fan 20, ram air outlet 22, air cycle machine 24, compressor 26, first turbine 28, second turbine 30, shaft 32, reheater 34, condenser 36, and water collector 38.

Environmental control system 10 can be mounted in an aircraft to supply conditioned air to the aircraft cabin at the proper temperature and pressure. Air is ingested into environmental control system 10 through air intake 12 and flows through a duct to primary heat exchanger 14. The air that enters air intake 12 can be compressed air that is bled off a gas turbine engine and/or compressed air from a dedicated cabin air compressor (not shown in FIG. 1).

Primary heat exchanger 14 is connected to secondary heat exchanger 16. Primary heat exchanger 14 and secondary heat exchanger 16 are used to cool the compressed air that flows through environmental control system 10 using cooling ram air. Ram air is pulled into environmental control system 10 through ram air inlet 18 with ram air fan 20 during operation on the ground or air is forced into the system due to flight of the aircraft. The ram air flows across primary heat exchanger 14 and secondary heat exchanger 16 to cool the air that flows through primary heat exchanger 14 and secondary heat exchanger 16. The used ram air is then dumped overboard through ram air outlet 22.

Air from air intake 12 is ducted to primary heat exchanger 14 where it is cooled with the ram air that is pulled across primary heat exchanger 14 with ram air fan 20. The cooled air from primary heat exchanger 14 then flows to air cycle machine 24. Air cycle machine 24 includes compressor 26, first turbine 28, and second turbine 30 that are all mounted to shaft 32. Ram air fan 20 also forms a part of air cycle machine 24 and is mounted to shaft 32. The cooled air from primary heat exchanger 14 first flows through compressor 26 of air cycle machine 24 from compressor inlet 26A to compressor outlet 26B. Compressor 26 includes a compressor rotor mounted to shaft 32 that is rotated with shaft 32 to further compress the air flowing through compressor 26 of air cycle machine 24. The compressed air from compressor 26 then flows to secondary heat exchanger 16 where it is further cooled with ram air that is pulled across secondary heat exchanger 16.

The cooled air from secondary heat exchanger 16 then flows through a duct to reheater 34 and condenser 36. Reheater 34 mixes the cooled air with recirculated air from the aircraft cabin to heat the cooled air. Condenser 36 condenses the cooled air by lowering the air temperature. The reheated and condensed air then flows through a duct to water collector 38, which collects the condensed water out of the air. The air then flows from water collector 38 back through reheater 34. Air from reheater 34 then flows through first turbine 28 of air cycle machine 24 from first turbine inlet 28A to first turbine outlet 28B. First turbine 28 also includes a first turbine rotor mounted on shaft 32. Energy is extracted from the air expanding through first turbine 28 of air cycle machine 24 to drive shaft 32.

Air from first turbine 28 then flows back through condenser 36. Air from condenser 36 then flows through second turbine 30 of air cycle machine 24 from second turbine inlet 30A to second turbine outlet 30B. Second turbine 30 also includes a second turbine rotor mounted on shaft 32. Energy is extracted from the air expanding through second turbine 30 of air cycle machine 24 to drive shaft 32. Air from second turbine 30 then flows out of air cycle machine 24 to be delivered to the aircraft cabin.

Environmental control system 10 also includes a plurality of temperature and pressure sensors, as is well known in the art. The plurality of temperature and pressure sensors have been omitted from FIG. 1 for clarity. Environmental control system 10 further includes check valves located throughout environmental control system 10 to control the flow of air through environmental control system 10. Check valves are used in environmental control system 10 to ensure that the air moving through environmental control system 10 is flowing in the proper direction during various operating modes of environmental control system 10.

Figure 2A:
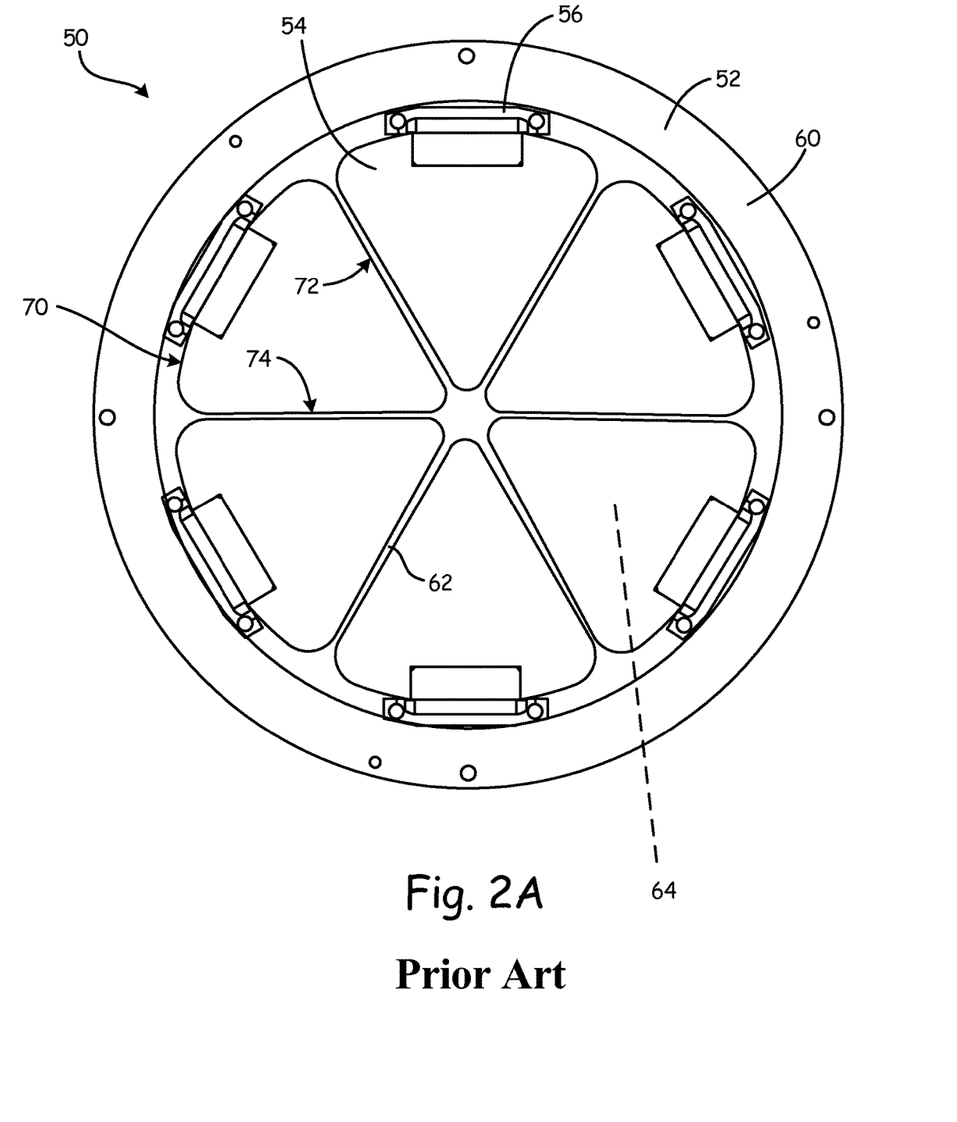
FIG. 2A is a front view of a prior art multi-flapper check valve.
Figure 2B:
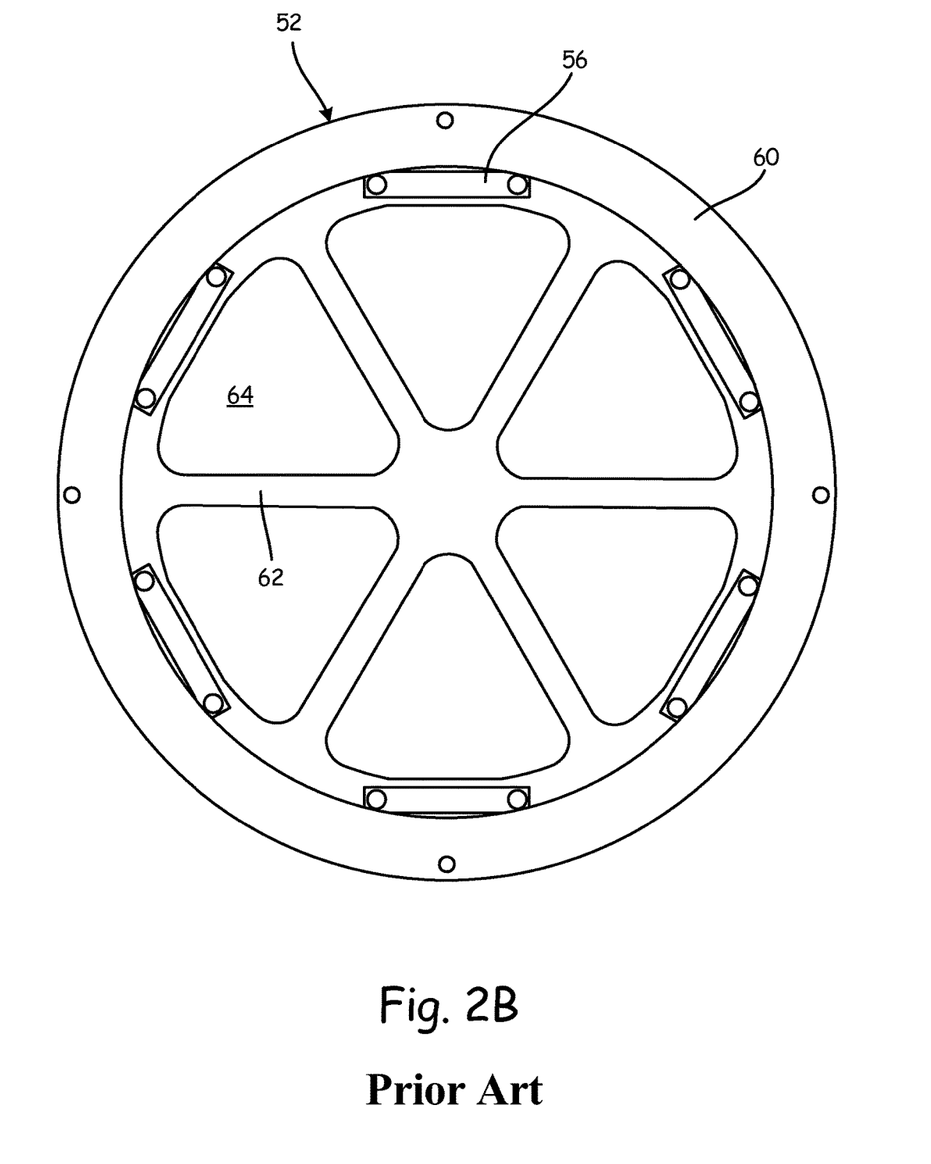
FIG. 2B is a front view of a housing of the prior art multi-flapper check valve.

FIG. 2A is a front view of prior art check valve 50. FIG. 2B is a front view of housing 52 of check valve 50. Check valve 50 is a prior art multi-flapper check valve. Check valve 50 includes housing 52, flappers 54, and hinges 56. Housing 52 includes rim 60, ribs 62, and openings 64. Flappers 54 each include end 70, first edge 72, and second edge 74. In FIG. 2B, in which only housing 52 is shown, flappers 54 are not present.

Check valve 50 can be used in pneumatic systems, for example environmental control system 10 seen in FIG. 1. Housing 52 forms a main body portion of check valve 50. Flappers 54 are attached to housing 52 with hinges 56. In the embodiment shown in FIGS. 2A-2B, check valve 50 includes six flappers 54. Check valve 50 can include any suitable number of flappers 54 in alternate embodiments.

Housing 52 includes rim 60, ribs 62, and openings 64. Rim 60 is a ring-shaped rim that forms an outer perimeter of housing 52. Ribs 62 extend from one side of rim 60 to a center of check valve 50 and act as center supports for housing 52 of check valve 50. There are six ribs 62 in the embodiment shown in FIGS. 2A-2B. The numbers of ribs 62 present in check valve 50 corresponds to the number of flappers 54 on check valve 50, thus there can be any suitable number of ribs 62 to correspond to the number of flappers 54 in alternate embodiments. Openings 64 are formed in housing 52 between rim 60 and ribs 62. There are six openings 64 in the embodiment shown in FIGS. 2A-2B. The numbers of openings 64 present in check valve 50 corresponds to the number of flappers 54 on check valve 50, thus there can be any suitable number of openings 64 to correspond to the number of flappers 54 in alternate embodiments.

Flappers 54 each include end 70, first edge 72, and second edge 74. Each flapper 54 is a triangular shape with two straight sides and a curved side. End 70 is the curved side of each flapper 54. End 70 of each flapper 54 is attached to one hinge 56 to attach each flapper 54 to housing 52. First edge 72 and second edge 74 are the straight sides of each flapper 54. First edge 72 and second edge 74 extend along ribs 62 of housing 52 when flappers 54 are positioned on housing 52 of check valve 50. First edge 72 and second edge 74 of each flapper 54 seal against ribs 62 of housing 52.

Check valve 50 can be positioned in a pneumatic system. Check valve 50 opens and closes due to changes in an air pressure differential between an inlet of check vale 50 and an outlet of check valve 50. In a closed position, first edge 72 and second edge 74 of each flapper 54 are sealed against ribs 62 of housing 52 and each flapper 54 covers one opening 64 in housing 52. To open, ends 70 of flappers 54 rotate about hinges 56. This reveals openings 64 in housing 52. Air can then flow through openings 64 of housing 52, thus allowing air to flow through check valve 50. To close, ends 70 of flappers 54 will rotate along hinge 56 towards housing 52 and first edge 72 and second edge 74 of each flapper 54 will seal along ribs 62. Each flapper 54 will again be positioned over one opening 64 in housing 52. This closes check valve 50 and prevents air from moving through check valve 50.

Check valve 50 as shown in FIGS. 2A-2B is a prior art check valve. As air flows through check valve 50, there is a pressure drop in the air moving through check valve 50 due to ribs 62. Ribs 62 of housing 52 extend across check valve 50 and impede the air as the air flows through check valve 50. This causes a drop in air pressure as the air flows through check valve 50. This drop in air pressure makes check valve 50 unsuitable for use in low pressure pneumatic systems.

Figure 3:
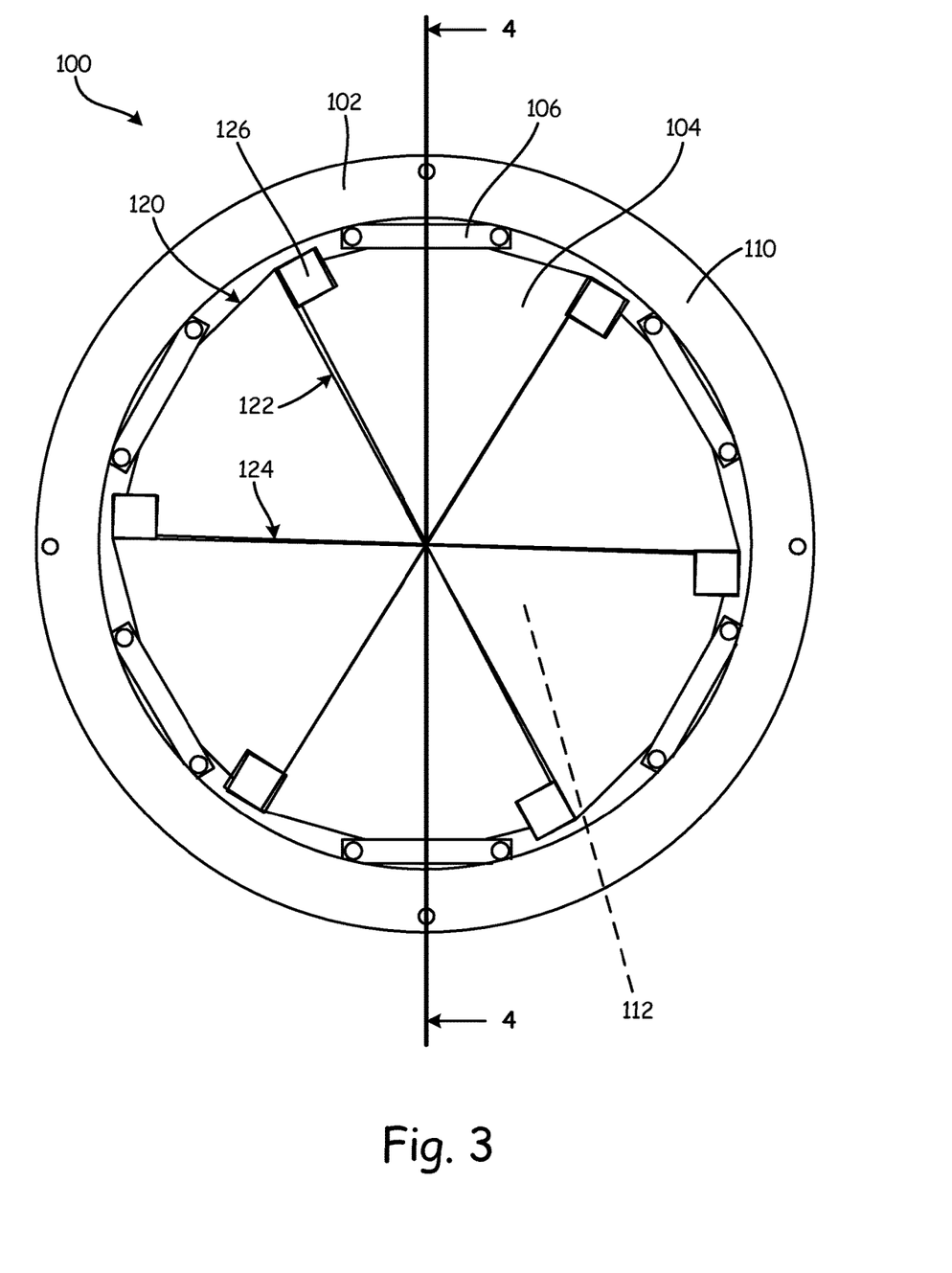
FIG. 3 is a front view of a multi-flapper check valve.
Figure 4:
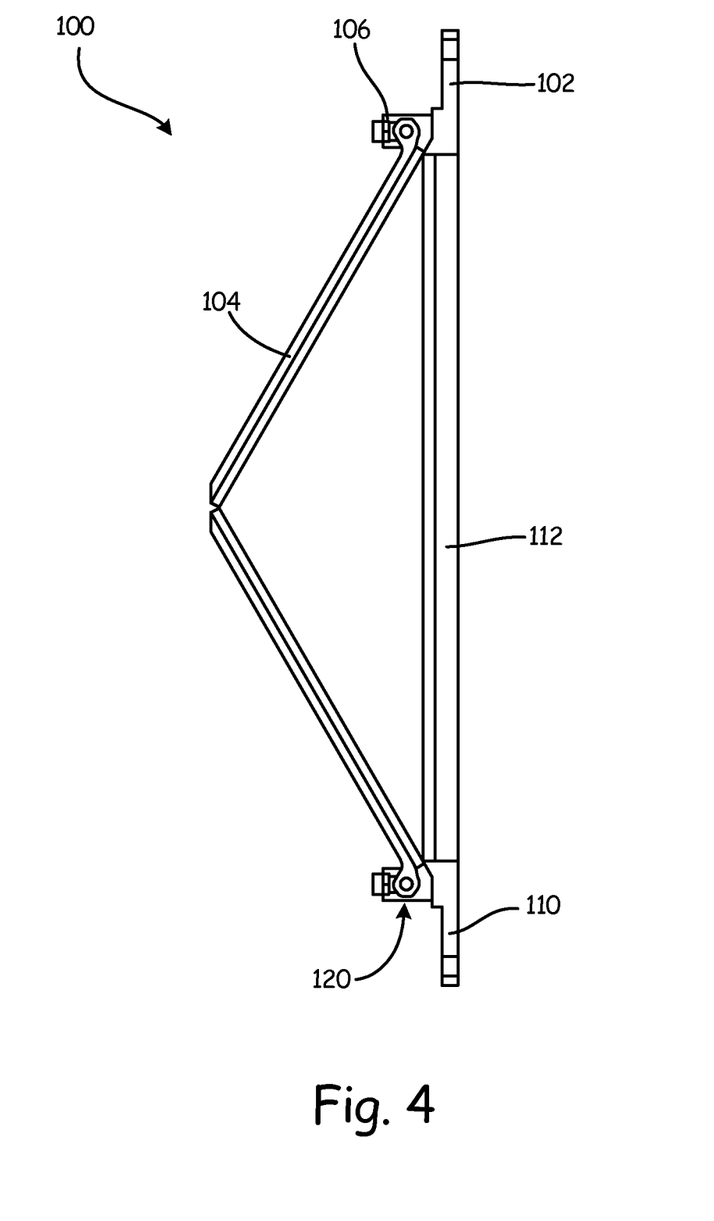
FIG. 4 is a cross-sectional side view of the multi-flapper check valve, taken along line 4-4 of FIG. 3.
Figure 5:
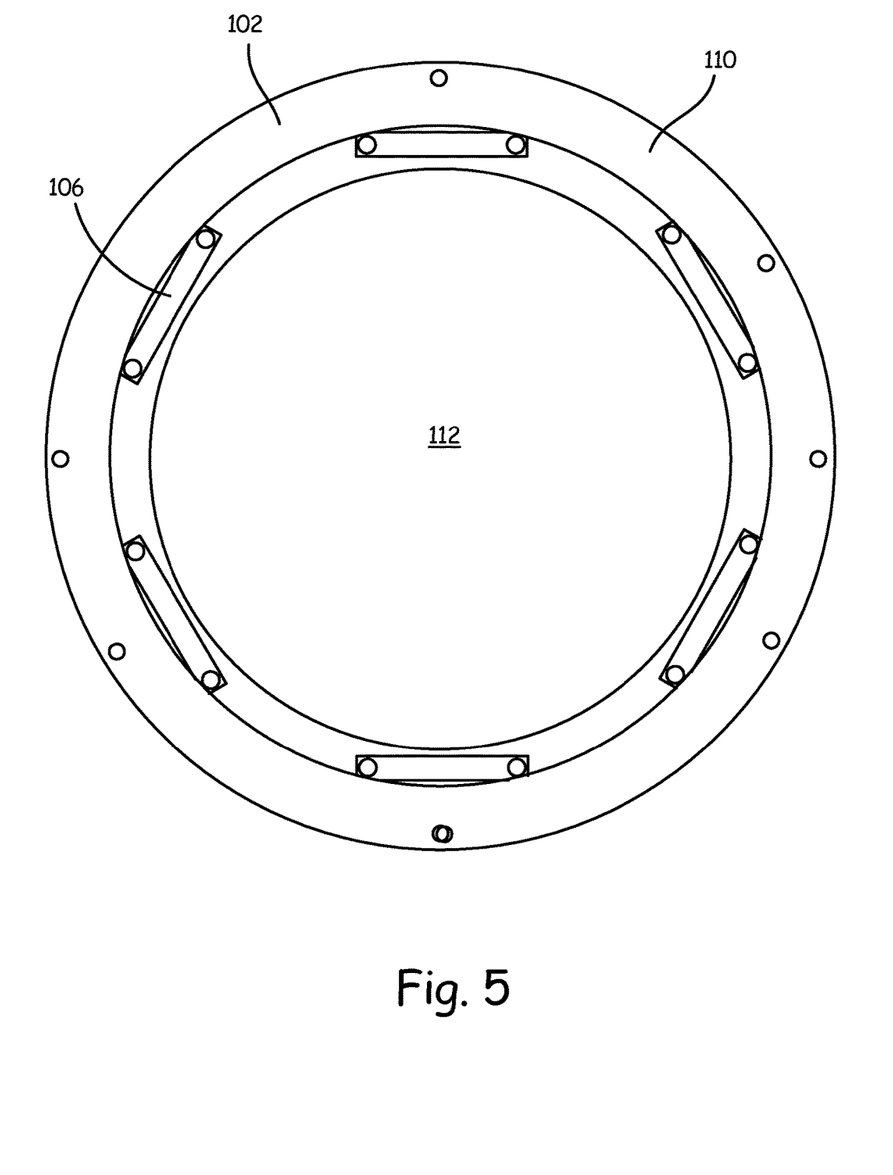
FIG. 5 is a front view of a housing of the multi-flapper check valve.

FIG. 3 is a front view of check valve 100. FIG. 4 is a cross-sectional side view of check valve 100, taken along line 4-4 of FIG. 3. FIG. 5 is a front view of housing 102 of check valve 100. Check valve 100 includes housing 102, flappers 104, and hinges 106. Housing 102 includes rim 110 and opening 112. Flappers 104 each include end 120, first edge 122, second edge 124, and tab 126.

Check valve 100 can be used in pneumatic systems, for example environmental control system 10 seen in FIG. 1. More specifically, check valve 100 can be use in low pressure pneumatic systems. Housing 102 forms a main body portion of check valve 100. Flappers 104 are attached to housing 102 with hinges 106. In the embodiment shown in FIGS. 3-5, check valve 100 includes six flappers 104. Check valve 100 can include any suitable number of flappers 104 in alternate embodiments.

As seen in FIG. 5, housing 102 includes rim 110 and opening 112. Rim 110 is a ring-shaped rim that forms an outer perimeter of housing 102. Opening 112 is a circular opening positioned inside of rim 110. Housing 102 does not have any ribs or flanges extending into opening 112 from rim 110. Hinges 106 are positioned on rim 110 of housing 102.

As shown in FIGS. 3 and 4, flappers 104 each include end 120, first edge 122, second edge 124, and tab 126. Each flapper 104 is a triangular shape with two straight sides and a curved side. End 120 is the curved side of each flapper 104. End 120 of each flapper 104 is attached to one hinge 106 to attach each flapper 104 to housing 102. First edge 122 and second edge 124 are the straight sides of each flapper 104. First edge 122 of each flapper 104 overlaps with and seals against second edge 124 of an adjacent flapper 104. One tab 126 is connected to first edge 122 of each flapper 104. Tabs 126 are flanges that extend outward from first edge 122 of one flapper 104 and extend across second edge 124 of the adjacent flapper 104. Tabs 126 ensure that first edge 122 of each flapper 104 overlaps second edge 124 of the adjacent flapper 104.

Check valve 100 can be positioned in a pneumatic system. Check valve 100 opens and closes due to changes in an air pressure differential between an inlet of check vale 100 and an outlet of check valve 100. In a closed position, first edge 122 of each flapper 104 seals against second edge 124 of the adjacent flapper 104 and tab 126 of each flapper 104 will fully overlap the adjacent flapper 104. This prevents air from moving through check valve 100. Check valve 100 opens when the air pressure reaches a certain level. To open, ends 120 of flappers 104 rotate about hinges 106. This reveals opening 112 in housing 102. Air can then flow through opening 112 of housing 102, thus allowing air to flow through check valve 100. To close, ends 120 of flappers 104 will rotate along hinge 106 towards housing 102 and first edge 122 of each flapper 104 will overlap and seal against second edge 124 of the adjacent flapper 104. Flappers 104 will cover opening 112 in housing 102. This closes check valve 100 and prevents air from moving through check valve 100.

Check valve 100 seen in FIGS. 3-5 is advantageous over the prior art valves of the type shown in FIGS. 2A-2B, as check valve 100 does not have any ribs extending across housing 102 of check valve 100. This creates a single opening 112 in housing 102 and prevents there from being a loss in pressure as air moves through check valve 100. This makes check valve 100 suitable for use in low pressure pneumatic systems because the loss in air pressure through housing 102 in check valve 100 is much lower than the loss in air pressure through housing 52 of prior art check valve 50 (seen in FIGS. 2A-2B) for the same size valve. Check valve 100 can open when the pressure of the air on the downstream side is lower than the air pressure on the upstream side.

Housing 102 of check valve 100 is simpler to design and manufacture, compared to prior art check valve 50 seen in FIGS. 2A-2B. Openings 64 in prior art check valve 50 had to be machined or otherwise manufactured into housing 52, which was time consuming and costly. Housing 102 of check valve 100 can be manufactured with opening 112, eliminating the need for machining or other manufacturing steps to create a number of smaller openings. This makes housing 102 of check valve 100 easier and most cost-efficient to manufacture. Housing 102 is also lower in weight compared to prior art housing 52, due to the elimination of the ribs.

Flappers 104 of check valve 100 are responsible for both the sealing and load carrying capabilities of check valve 100, except at ends 120 where flappers 104 are attached to housing 102. Flappers 104 are loaded against first edge 122 and second edge 124. As seen in FIG. 4, when check valve 100 is in a closed position, flappers 104 form a conical shape. First edge 122 of flappers 104 and second edge 124 of flappers 104 are designed so that first edge 122 overlaps second edge 124. This allows check valve 100 to seal without jamming. Tabs 126 on flappers 104 further prevent jamming, as tabs 126 ensure that first edge 122 overlaps second edge 124 as check valve 100 closes. Tabs 126 also prevent flappers 104 from getting misaligned or disengaging one another when check valve 100 is in an open position.

Figure 6A:
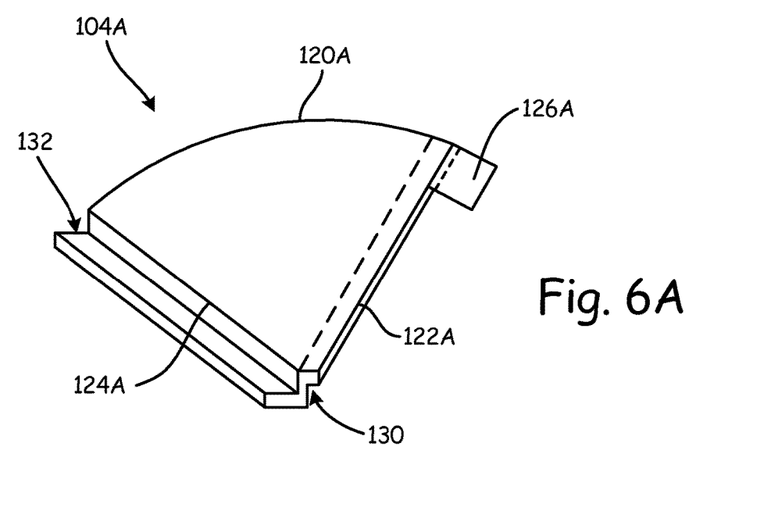
FIG. 6A is a perspective view of a first embodiment of a flapper.
Figure 6B:
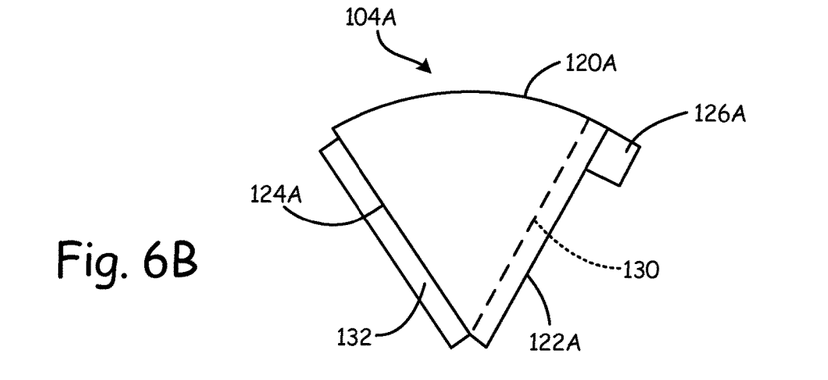
FIG. 6B is a front view of the first embodiment of the flapper.
Figure 6C:
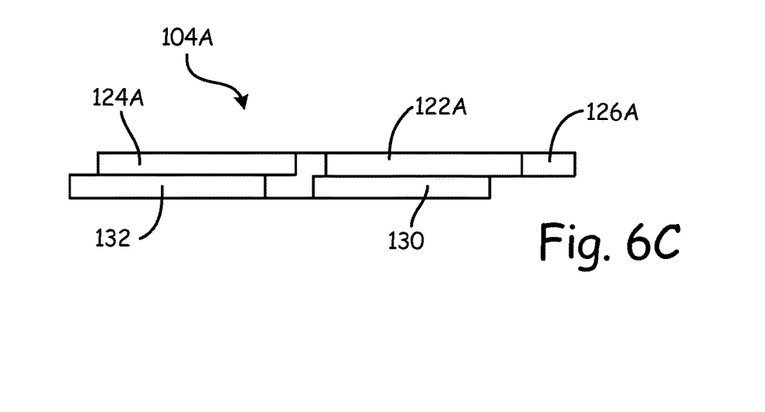
FIG. 6C is a side view of the first embodiment of the flapper.

FIG. 6A is a perspective view of flapper 104A. FIG. 6B is a front view of flapper 104A. FIG. 6C is a side view of flapper 104A. Flapper 104A includes end 120A, first edge 122A, second edge 124A, tab 126A, first lip 130, and second lip 132.

Flapper 104A is a first embodiment of a flapper that can be used in check valve 100, as seen in FIGS. 3-5. Flapper 104A is a stepped flapper that has stepped edges that overlap. Flapper 104A is a triangular shape with two straight sides and a curved side. End 120A is the curved side of flapper 104A and can be used to attached flapper 104A to check valve 100. First edge 122A and second edge 124A are the straight sides of flapper 104A that overlap and seal against one another when check valve 100 is in a closed position. Tab 126A is connected to first edge 122A of flapper 104A and extends away from flapper 104A.

First edge 122A of flapper 104A has first lip 130 cut into it. First lip 130 is a step that is cut into a bottom side of flapper 104A. Second edge 124A of flapper 104A has second lip 132 cut into it. Second lip 132 is a step that is cut into a top side of flapper 104A. First lip 130 on first edge 122A is sized so that it fits with second lip 132 on second edge 124A. This allows first lip 130 on first edge 122A to seal with second lip 132 on second edge 124A.

First lip 130 and second lip 132 on flapper 104A makes flapper 104A suitable for use in check valve 100, as seen in FIGS. 3-5. Check valve 100 is suitable for use in low pressure pneumatic systems, as check valve 100 has flappers 104 that overlap and seal against one another. Flapper 104A has first lip 130 and second lip 132 so that first lip 130 on a first flapper 104A can overlap and seal against second lip 132 on an adjacent flapper 104A. This makes flapper 104A suitable for use on check valve 100.

Figure 7A:
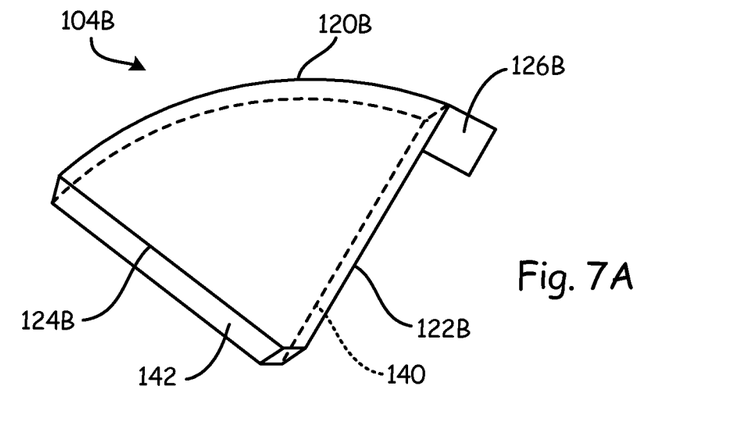
FIG. 7A is a perspective view of a second embodiment of a flapper.
Figure 7B:
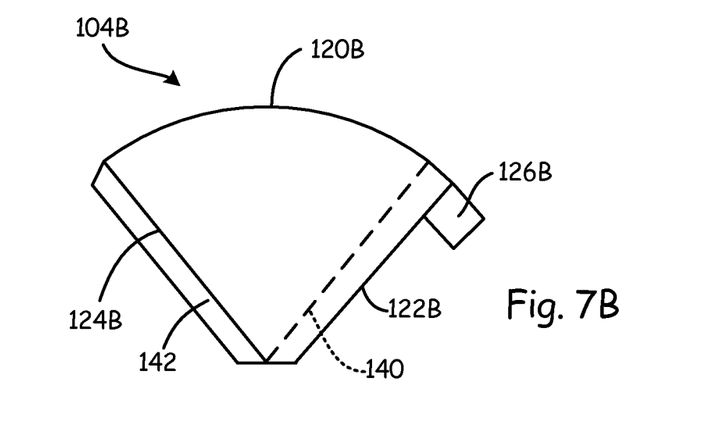
FIG. 7B is a front view of the second embodiment of the flapper.
Figure 7C:
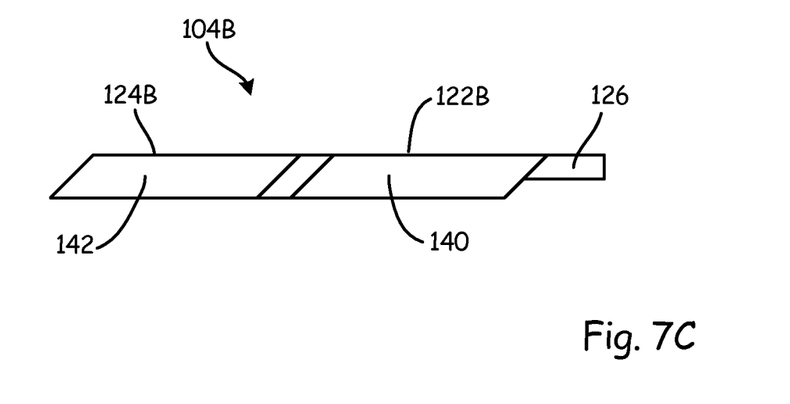
FIG. 7C is a side view of the second embodiment of the flapper.

FIG. 7A is a perspective view of flapper 104B. FIG. 7B is a front view of flapper 104B. FIG. 7C is a side view of flapper 104B. Flapper 104B includes end 120B, first edge 122B, second edge 124B, tab 126B, first angled face 140, and second angled face 142.

Flapper 104B is a second embodiment of a flapper that can be used in check valve 100, as seen in FIGS. 3-5. Flapper 104B is angled flapper that has angled edges that overlap. Flapper 104B is a triangular shape with two straight sides and a curved side. End 120B is the curved side of flapper 104B and can be used to attached flapper 104B to check valve 100. First edge 122B and second edge 124B are the straight sides of flapper 104B that overlap and seal against one another when check valve 100 is in a closed position. Tab 126B is connected to first edge 122B of flapper 104B and extends away from flapper 104B.

First edge 122B of flapper 104B has first angled face 140. Second edge 124B of flapper 104B has second angled face 142. First angled face 140 of first edge 122B and second angled face 142 of second edge 124B are cut at the same angle. This allows first angled face 140 of first edge 122B to seal against second angled face 142 of second edge 124B.

First angled face 140 and second angled face 142 on flapper 104B makes flapper 104B suitable for use in check valve 100, as seen in FIGS. 3-5. Check valve 100 is suitable for use in low pressure pneumatic systems, as check valve 100 has flappers 104 that overlap and seal against one another. Flapper 104B has first angled face 140 and second angled face 142 so that first angled face 140 on a first flapper 104B can overlap and seal against second angled face 142 on an adjacent flapper 104B. This makes flapper 104B suitable for use on check valve 100.

Discussion of Possible Embodiments

The following are non-exclusive descriptions of possible embodiments of the present invention.

A multi-flapper check valve includes a housing with an opening surrounded by a ring-shaped rim, a plurality of flappers, and a hinge that connects an end of each flapper to the rim of the housing. When the multi-flapper check valve is in a closed position, a first edge of each flapper seals against a second edge of an adjacent flapper.

The multi-flapper check valve of the preceding paragraph can optionally include, additionally and/or alternatively, any one or more of the following features, configurations and/or additional components:

When the multi-flapper check valve is in a closed position, the plurality of flappers are configured to cover the opening in the housing.

When the multi-flapper check valve is in an opening position, each flapper is configured to rotate with the hinge to uncover the opening in the housing.

A further embodiment of the multi-flapper check valve, wherein the first edge of the flapper has a lip cut into a bottom portion of the flapper, and the second edge of the flapper has a lip cut into a top portion of the flapper.

A further embodiment of the multi-flapper check valve, wherein the first edge of the flapper is angled, and the second edge of the flapper is angled.

A further embodiment of the multi-flapper check valve, and further including a tab extending from the first edge of the flapper, wherein the tab overlaps the adjacent flapper.

A further embodiment of the multi-flapper check valve, wherein there are six flappers on the multi-flapper check valve.

A further embodiment of the multi-flapper check valve, wherein there are no ribs extending across the opening in the housing.

An environmental control system includes a rotary machine and a check valve in the rotary machine. The rotary machine includes a compressor section with a compressor rotor, and a turbine section with a turbine rotor. The check valve includes a housing with an opening surrounded by a ring-shaped rim, and a plurality of flappers connected to the ring-shaped rim. When the check valve is in a closed position, a first edge of each flapper seals against a second edge of an adjacent flapper.

The environmental control system of the preceding paragraph can optionally include, additionally and/or alternatively, any one or more of the following features, configurations and/or additional components:

A further embodiment of the environmental control system, wherein when the check valve is in a closed position, the plurality of flappers are configured to seal against one another to cover the opening in the housing of the check valve.

A further embodiment of the environmental control system, wherein when the check valve is in a closed position, the plurality of flappers are configured to prevent air from flowing through the rotary machine.

A further embodiment of the environmental control system, wherein when the check valve is in an open position, the plurality of flappers are configured to uncover the opening in the housing of the check valve.

A further embodiment of the environmental control system, wherein the check valve further includes a hinge that connects an end of each flapper to the rim of the housing, and a tab extending from the first edge of the flapper.

A further embodiment of the environmental control system, wherein the first edge of the flapper has a lip cut into a bottom portion of the flapper, and the second edge of the flapper has a lip cut into a top portion of the flapper.

A further embodiment of the environmental control system, wherein the first edge of the flapper is angled, and the second edge of the flapper is angled.

A method includes flowing air through a rotary machine, and controlling the flow of air through the rotary machine with a check valve positioned in the rotary machine. The check valve includes a housing with an opening surrounded by a ring-shaped rim and a plurality of flappers connected to the ring-shaped rim, wherein a first edge of each flapper seals against a second edge of an adjacent flapper.

The method of the preceding paragraph can optionally include, additionally and/or alternatively, any one or more of the following features, configurations and/or additional components:

A further embodiment of the method, wherein the check valve can be moved between an open and closed position by rotating the flappers of the check valve around a hinge that connects the flappers to the rim of the housing.

A further embodiment of the method, wherein moving the check valve to an open positioned unseals the first edge of each flapper from the second edge of the adjacent flapper and uncovers the opening in the housing of the check valve.

A further embodiment of the method, wherein there are no ribs extending across the opening in the housing.

A further embodiment of the method, wherein the check valve further includes a tab extending from the first edge of each flapper.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A multi-flapper check valve comprising:
   a housing with an opening surrounded by a ring-shaped rim;
   a plurality of flappers, wherein each flapper has a curved end, a first straight edge extending away from the curved end, a second straight edge extending away from the curved end, and a pointed tip at an intersection of the first straight edge and the second straight edge; and
   a hinge that connects the curved end of each flapper to the rim of the housing;
   wherein when the multi-flapper check valve is in a closed position, the first straight edge of each flapper overlaps and seals against the second straight edge of an adjacent flapper from the curved end of each flapper to the pointed tip of each flapper;
   wherein the first straight edge of the flapper has a lip cut into a bottom portion of the flapper, and the second straight edge of the flapper has a lip cut into a top portion of the flapper.

2. The multi-flapper check valve of claim 1, wherein when the multi-flapper check valve is in a closed position, the plurality of flappers are configured to cover the opening in the housing.

3. The multi-flapper check valve of claim 1, wherein when the multi-flapper check valve is in an open position, each flapper is configured to rotate with the hinge to uncover the opening in the housing.

4. The multi-flapper check valve of claim 1, and further comprising:
 a tab extending from the first straight edge of the flapper, wherein the tab overlaps the adjacent flapper.

5. The multi-flapper check valve of claim 1, wherein there are six flappers on the multi-flapper check valve.

6. The multi-flapper check valve of claim 1, wherein there are no ribs extending across the opening in the housing.

7. An environmental control system comprising:
 a rotary machine comprising:
  a compressor section with a compressor rotor; and
  a turbine section with a turbine rotor; and
 a check valve in the rotary machine, the check valve comprising:
  a housing with an opening surrounded by a ring-shaped rim; and
  a plurality of flappers connected to the ring-shaped rim, wherein each flapper has a curved end, a first straight edge extending away from the curved end, a second straight edge extending away from the curved end, and a pointed tip at an intersection of the first straight edge and the second straight edge, and wherein when the check valve is in a closed position, the first straight edge of each flapper overlaps and seals against the second straight edge of an adjacent flapper from the curved end of each flapper to the pointed tip of each flapper.

8. The environmental control system of claim 7, wherein when the check valve is in a closed position, the plurality of flappers are configured to overlap and seal against one another to cover the opening in the housing of the check valve.

9. The environmental control system of claim 8, wherein when the check valve is in a closed position, the plurality of flappers are configured to prevent air from flowing through the rotary machine.

10. The environmental control system of claim 7, wherein when the check valve is in an open position, the plurality of flappers are configured to uncover the opening in the housing of the check valve.

11. The environmental control system of claim 7, wherein the check valve further comprises:
 a hinge that connects the curved end of each flapper to the rim of the housing; and
 a tab extending from the first straight edge of the flapper.

12. The environmental control system of claim 7, wherein:
 the first straight edge of the flapper has a lip cut into a bottom portion of the flapper; and
 the second straight edge of the flapper has a lip cut into a top portion of the flapper.

13. The environmental control system of claim 7, wherein:
 the first straight edge of the flapper is angled; and
 the second straight edge of the flapper is angled;
 wherein the first straight edge and the second straight edge are at angles other than 90 degrees.

14. A method comprising:
 flowing air through a rotary machine; and
 controlling the flow of air through the rotary machine with a check valve positioned in the rotary machine, wherein the check valve includes a housing with an opening surrounded by a ring-shaped rim and a plurality of flappers connected to the ring-shaped rim, wherein each flapper has a curved end, a first straight edge extending away from the curved end, a second straight edge extending away from the curved end, and a pointed tip at an intersection of the first straight edge and the second straight edge, and wherein the first straight edge of each flapper overlaps and seals against the second straight edge of an adjacent flapper from the curved end of each flapper to the pointed tip of each flapper.

15. The method of claim 14, wherein the check valve can be moved between an open and closed position by rotating the flappers of the check valve around a hinge that connects the flappers to the rim of the housing.

16. The method of claim 15, wherein moving the check valve to the open position unseals the first straight edge of each flapper from the second straight edge of the adjacent flapper and uncovers the opening in the housing of the check valve.

17. The method of claim 14, wherein there are no ribs extending across the opening in the housing.

18. The method of claim 14, wherein the check valve further comprises:
 a tab extending from the first straight edge of each flapper.

* * * * *